(12) United States Patent
Li et al.

(10) Patent No.: US 10,359,615 B2
(45) Date of Patent: Jul. 23, 2019

(54) CAMERA MODULE

(71) Applicants: TRIPLE WIN TECHNOLOGY(SHENZHEN) CO. LTD., Shenzhen (CN); HON HAI PRECISION INDUSTRY CO., LTD., New Taipei (TW)

(72) Inventors: Kun Li, Guangdong (CN); Shin-Wen Chen, New Taipei (TW); Jing-Wei Li, Guangdong (CN); Sheng-Jie Ding, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 15/856,081

(22) Filed: Dec. 28, 2017

(65) Prior Publication Data

US 2019/0170994 A1   Jun. 6, 2019

(30) Foreign Application Priority Data

Dec. 4, 2017 (CN) .......................... 2017 1 1262682

(51) Int. Cl.
G02B 21/36 (2006.01)
G02B 21/00 (2006.01)
G02B 21/02 (2006.01)
G02B 7/00 (2006.01)

(52) U.S. Cl.
CPC .......... *G02B 21/361* (2013.01); *G02B 7/006* (2013.01); *G02B 21/0008* (2013.01); *G02B 21/02* (2013.01); *G02B 21/362* (2013.01)

(58) Field of Classification Search
None
See application file for complete search history.

(56) References Cited

U.S. PATENT DOCUMENTS

| 2007/0145426 | A1* | 6/2007 | Kim | .................. | H01L 27/14632 |
| | | | | | 257/234 |
| 2009/0201577 | A1* | 8/2009 | LaPlante | ............ | G01N 21/6458 |
| | | | | | 359/355 |
| 2014/0160791 | A1* | 6/2014 | Guo | ...................... | G02B 6/0031 |
| | | | | | 362/609 |
| 2018/0192030 | A1* | 7/2018 | Greenberg | ............ | G02B 21/367 |

FOREIGN PATENT DOCUMENTS

TW          201734622 A       10/2017

* cited by examiner

*Primary Examiner* — Eileen M Adams
(74) *Attorney, Agent, or Firm* — ScienBiziP, P.C.

(57) ABSTRACT

A camera module which collects incoming dirt and dust so as to prevent the accumulation of same on an optical element of the image-capturing process includes a microscope base and an optical filter unit. The microscope base includes a supporting portion. A first gap is formed in the supporting portion. The optical filter unit filter and adhesive layer formed on the optical filter. The optical filter is bonded on the supporting portion by the adhesive layer. The optical filter comprises a filter area in the optical filter. A surface of the adhesive layer facing away from the optical filter is adhesive. A second gap is formed in the adhesive layer. The filter area is exposed from the second gap. Parts of the adhesive layer and the filter area are exposed from the first gap.

9 Claims, 3 Drawing Sheets

CAMERA MODULE

FIELD

The subject matter generally relates to a camera module.

BACKGROUND

Most mobile phone camera modules are composed of six major parts, a lens, a motor, an optical filter, a chip, a plastic base, and a circuit board. The optical filter filters a part of infrared light through a coating film on the optical filter.

Quality requirements of the mobile phone camera are getting higher and higher. At present, the coating film on the optical filter is not dust-repellent. There is no barrier to dust, debris, and other pollutants falling onto the optical filter, thereby causing poor imaging. Improvement in the art is preferred.

BRIEF DESCRIPTION OF THE DRAWINGS

Implementations of the present disclosure will now be described, by way of example only, with reference to the attached figures.

DETAILED DESCRIPTION OF EMBODIMENTS

Figure 1:
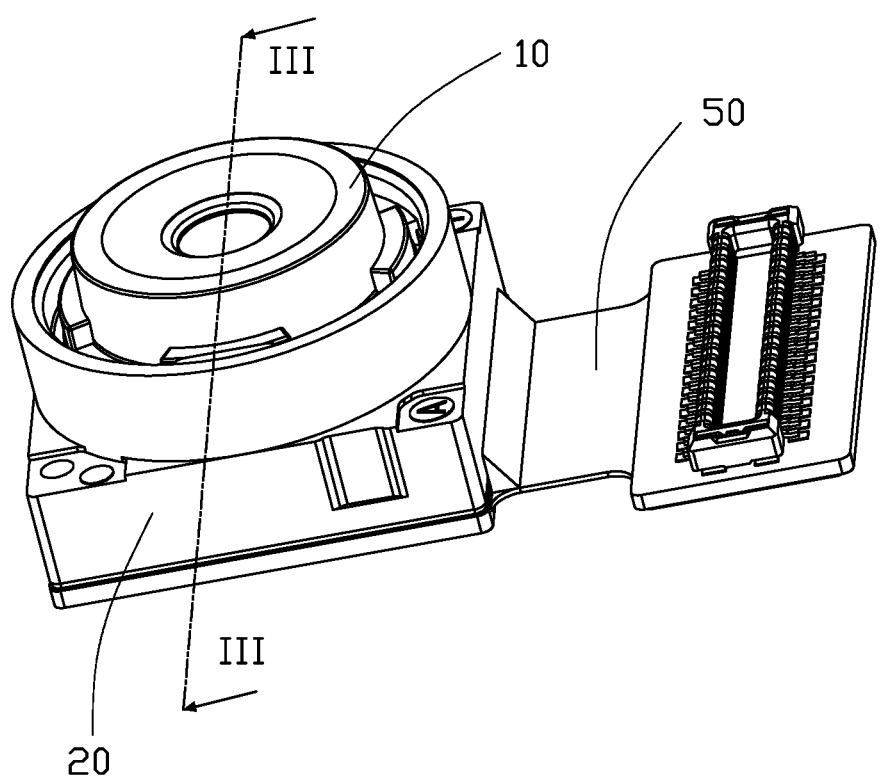
FIG. 1 is a cross-sectional view of an exemplary embodiment of a camera module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

Figure 2:
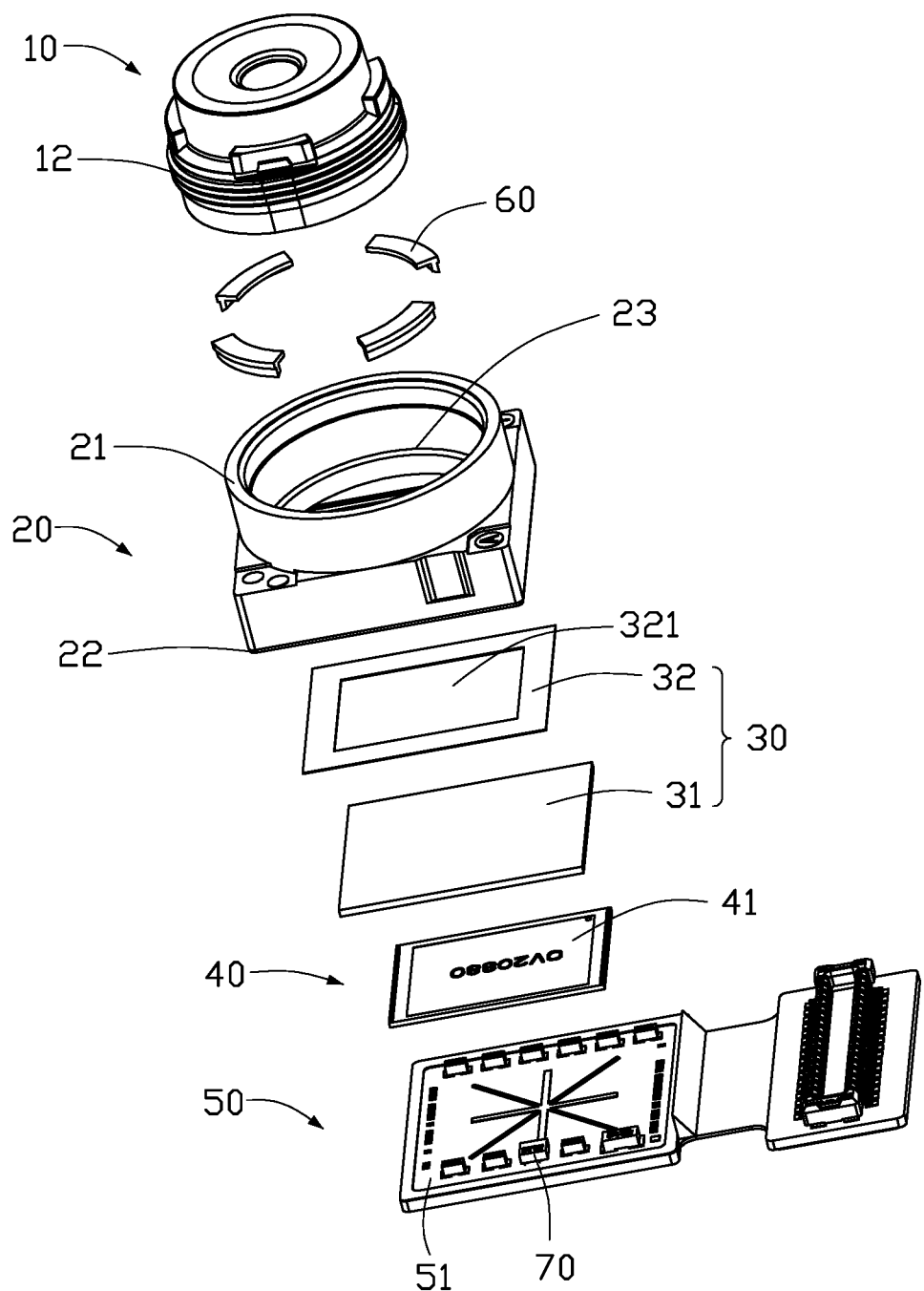
FIG. 2 is an exploded view of the camera module of FIG. 1.
Figure 3:
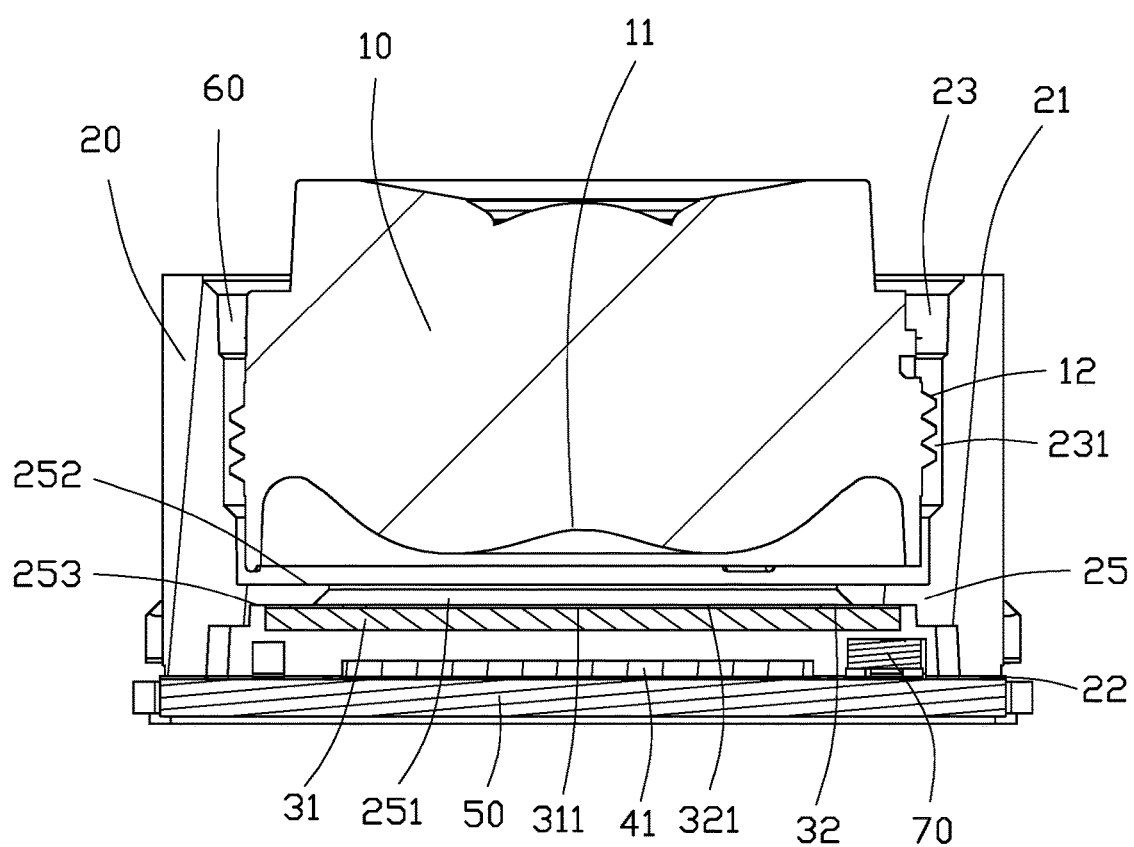
FIG. 3 is a cross-sectional view of the camera module of FIG. 1 along line of FIG. 1.

FIGS. 1-3 illustrate an exemplary embodiment of a camera module 100. The camera module 100 includes a camera lens 10, a microscope base 20, an optical filter unit 30, a sensor 40, a printed circuit board 50, a motor 60, and a plurality of electronic components 70.

The camera lens 10, the motor 60, and the optical filter unit 30 are received in the microscope base 20.

The microscope base 20 is mounted on the printed circuit board 50.

The sensor 40 and the plurality of electronic components 70 are received in the microscope base 20 and mounted on the printed circuit board 50.

The camera lens 10 includes at least one lens 11. External threads 12 are formed on outer surface of the camera lens 10.

The microscope base 20 includes a first surface 21 and a second surface 22 facing away from the first surface 21.

A first receiving groove 23 is formed in the microscope base 20.

The first receiving groove 23 is perpendicularly defined between the first surface 21 and the second surface 22.

The camera lens 10 is received in the first receiving groove 23.

Internal threads 231 are formed on inner surface of the first receiving groove 23.

The internal threads 231 mesh with the external threads 12.

A second receiving groove 24 is formed in the microscope base 20.

The second receiving groove 24 is perpendicularly defined between the second surface 22 and the first surface 21.

The microscope base 20 further includes a supporting portion 25.

The supporting portion 25 is formed between the first receiving groove 23 and the second receiving groove 24.

A first gap 251 is formed in the middle of the supporting portion 25.

In at least one exemplary embodiment, the second receiving groove 24 is connected to the first receiving groove 23 by the first gap 251.

The supporting portion 25 includes a third surface 252 facing the lens 11 and a fourth surface 253 facing away from the third surface 252.

The motor 60 is received in the first receiving groove 23.

The motor 60 is used to drive the camera lens 10 in and out to realize focusing.

The optical filter unit 30 includes an optical filter 31 and an adhesive layer 32 formed on the optical filter 31.

In at least one exemplary embodiment, a material of the optical filter 31 is glass.

The optical filter 31 filters against stray light entering into the camera module 100.

The optical filter 31 includes a filter area 311 in the middle of the optical filter 31.

The adhesive layer 32 is not light-reflective.

A surface of the adhesive layer 32 facing away from the optical filter 31 and a surface of the adhesive layer 32 facing the optical filter 31 are adhesive.

A second gap 321 is formed in the adhesive layer 32. The filter area 311 is exposed from the second gap 321.

In at least one exemplary embodiment, the adhesive layer 32 is black Mylar.

The optical filter 31 is received in the second receiving groove 24 and bonded on the fourth surface 253 of the supporting portion 25 by the adhesive layer 32.

Parts of the adhesive layer 32 and the filter area 311 are exposed from the first gap 251.

The sensor 40 is mounted on the printed circuit board 50 and received in the second receiving groove 24.

The sensor 40 includes a photosensitive area 41 facing the filter area 311. The sensor 40 is electrically connected to the printed circuit board 50.

The plurality of electronic components 70 is mounted around the sensor 40 and received in the second receiving groove 24.

With the above configuration, the camera module 100 uses the adhesive layer 32 to bond the optical filter 31 and the supporting portion 2 of the microscope base 20. Firstly, the adhesive layer 32 is non-reflective, so the adhesive layer 32 prevents light entering into the camera module 100 and reflecting onto the sensor 40 and creating light flares in images. Secondly, the adhesive layer 32 can be stuck on the optical filter 31 directly, so the optical filter unit 30 has a simpler fabrication and a lower cost. Thirdly, the adhesive layer 32 is exposed from the first gap 251 of the supporting portion 25, and a surface of the adhesive layer 32 facing away from the optical filter 31 is adhesive, so the adhesive layer 32 exposed from the first gap 251 operates to gather dust and other polluting particles entering into the camera module 100.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera module, comprising:
   a microscope base; wherein the microscope base comprises a supporting portion, a first gap is formed in the supporting portion;
   an optical filter unit; wherein the optical filter unit comprises an optical filter and an adhesive layer formed on the optical filter; the optical filter is bonded on the supporting portion by the adhesive layer; the optical filter comprises a filter area in the optical filter; a surface of the adhesive layer facing away from the optical filter is adhesive; a second gap is formed in the adhesive layer, the filter area can be exposed from the second gap, parts of the adhesive layer and the filter area are exposed from the first gap; and
   a camera lens; wherein the microscope base comprises a first surface and a second surface facing away from the first surface, first and second receiving grooves are formed in the microscope base, the first receiving groove is perpendicularly defined between the first surface and the second surface, the second receiving groove is perpendicularly defined between the second surface and the first surface, the camera lens is received in the first receiving groove, and the optical filter unit is received in the second receiving groove.

2. The camera module of claim 1, wherein the adhesive layer is not light-reflective.

3. The camera module of claim 2, wherein a surface of the adhesive layer facing the optical filter is adhesive.

4. The camera module of claim 2, wherein the adhesive layer is a black Mylar.

5. The camera module of claim 1, wherein the supporting portion is formed between the first receiving groove and the second receiving groove, the second receiving groove is connected to the first receiving groove by the first gap.

6. The camera module of claim 1, wherein the camera module further comprises a sensor, the sensor comprises a photosensitive area facing the filter area.

7. The camera module of claim 6, wherein the camera module further comprises printed circuit board, the sensor is mounted on the printed circuit board and received in the second receiving groove, the sensor is electrically connected to the printed circuit board.

8. The camera module of claim 1, wherein the camera module further comprises a motor, the motor is received in the first receiving groove.

9. The camera module of claim 1, wherein a group of external threads is formed on outer surface of the camera lens, a group of internal threads is formed on inner surface of the first receiving groove, and the group of internal threads can mesh with the group of external threads.

* * * * *